United States Patent [19]
Ono et al.

[11] Patent Number: 4,945,529
[45] Date of Patent: Jul. 31, 1990

[54] OPTICAL HEAD COMPRISING A DIFFRACTION GRATING FOR DIRECTING TWO OR MORE DIFFRACTED BEAMS TO OPTICAL DETECTORS

[75] Inventors: Yuzo Ono; Yutaka Yamanaka; Yasuo Kimura, all of Tokyo, Japan

[73] Assignee: NEC Corporation, Tokyo, Japan

[21] Appl. No.: 940,007

[22] Filed: Dec. 10, 1986

[30] Foreign Application Priority Data

| Dec. 10, 1985 | [JP] | Japan | 60-278365 |
|---|---|---|---|
| Dec. 12, 1985 | [JP] | Japan | 60-280603 |
| Jan. 24, 1986 | [JP] | Japan | 61-14144 |
| Mar. 18, 1986 | [JP] | Japan | 61-60305 |
| Mar. 18, 1986 | [JP] | Japan | 61-60306 |
| May 26, 1986 | [JP] | Japan | 61-121575 |
| May 26, 1986 | [JP] | Japan | 61-121577 |
| Jun. 10, 1986 | [JP] | Japan | 61-132723 |
| Jun. 10, 1986 | [JP] | Japan | 61-132724 |
| Jul. 2, 1986 | [JP] | Japan | 61-156406 |
| Aug. 27, 1986 | [JP] | Japan | 61-202245 |

[51] Int. Cl.$^5$ .................. G01J 1/20; G11B 21/10; G11B 7/13
[52] U.S. Cl. .................. 369/109; 250/237 G; 369/46; 369/110; 369/120; 369/44.11
[58] Field of Search .............. 369/109, 112, 111, 120, 369/46, 103; 250/237 G; 350/162.17, 3.72, 3.7

[56] References Cited

U.S. PATENT DOCUMENTS

| 3,876,842 | 4/1975 | Bouwhuis | 369/109 |
|---|---|---|---|
| 4,498,159 | 2/1985 | Daimon | 369/109 |
| 4,624,526 | 11/1986 | Tsukoi | 369/109 |
| 4,665,310 | 5/1987 | Heemskerk | 369/45 |
| 4,731,772 | 3/1988 | Lee | 369/46 |
| 4,733,065 | 3/1988 | Hoshi | 369/46 |

OTHER PUBLICATIONS

M. G. Carasso et al., "The Compact Disc Digital Audio System", Phillips Tech., Rev. 40, 151–155, 1982, No. 6.
"Techniques for Mastering CD Digital Audios", May 15, 1985, Seibundo Sinkosya, pp. 19–36.

Primary Examiner—Steven L. Stephan
Attorney, Agent, or Firm—Sughrue, Mion, Zinn, Macpeak & Seas

[57] ABSTRACT

For use in combination with an optical source for generating a coherent beam along a main optical axis, an optical head device comprises a diffraction grating having a plurality of grating regions which are responsive to the coherent beam for directing a zeroth-order diffracted beam to a focussing lens and are responsive to an optical beaem reflected from an optical recording medium for directing sidewards diffracted beams to an optical detector assembly. An effective area of a diameter of about 5 mm is sufficient for the diffraction grating. Each sidewards diffracted beam may form an angle of 20° with the main optical axis. The optical detector assembly is used in detecting focussing and tracking errors for the recording medium and can be used in reproducing optical information from the recording medium. A six-partitioned optical detector assembly is preferred when the grating regions are four in number. Either a four-partitioned or a three-partitioned optical detector assembly is preferred when the grating regions are two in number. Depending on the grating regions, the optical detector assembly preferably has two optical detector elements which are placed on different levels relative to the diffraction grating.

25 Claims, 7 Drawing Sheets

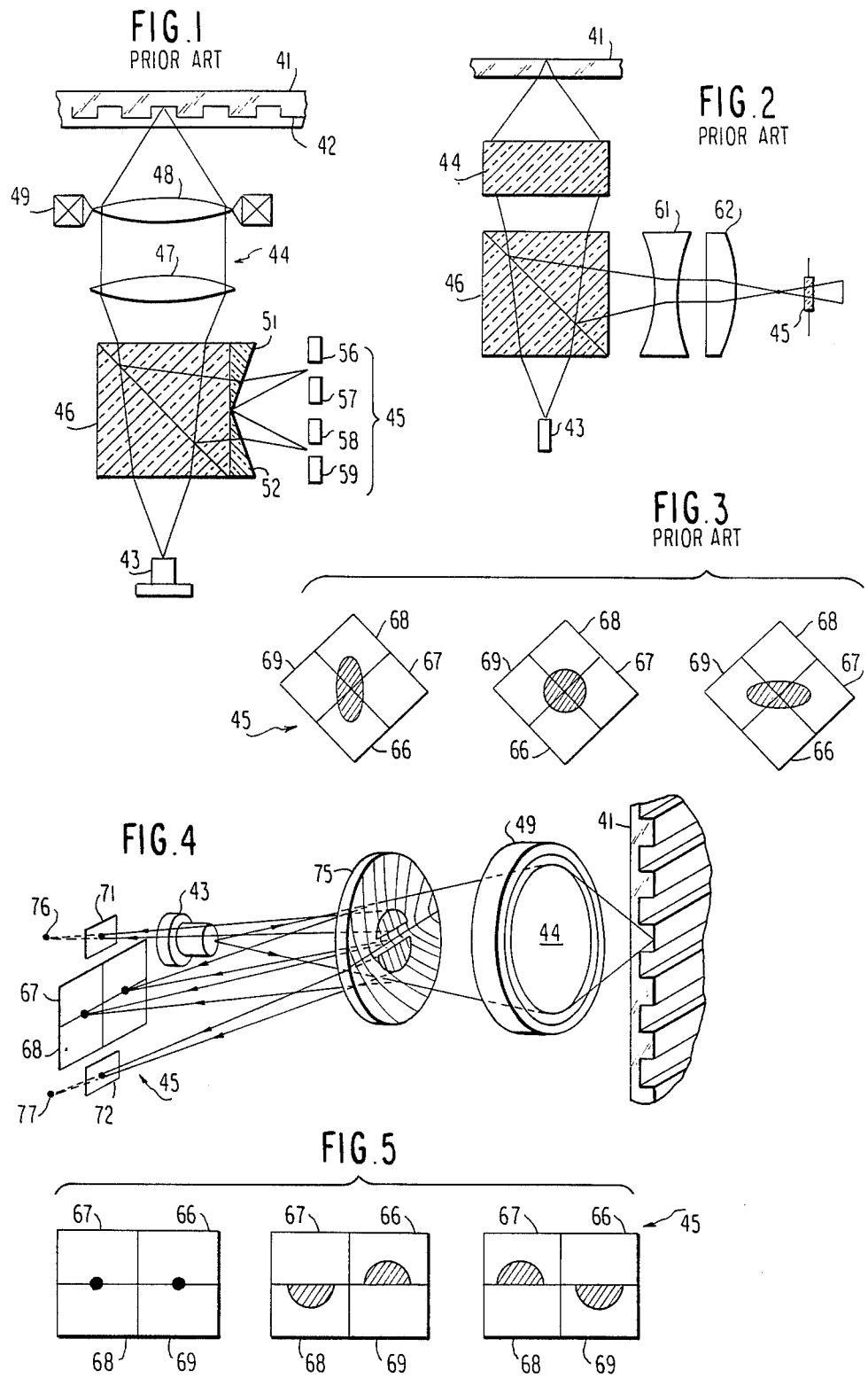

U.S. Patent   Jul. 31, 1990   Sheet 3 of 7   4,945,529
FIG. 10
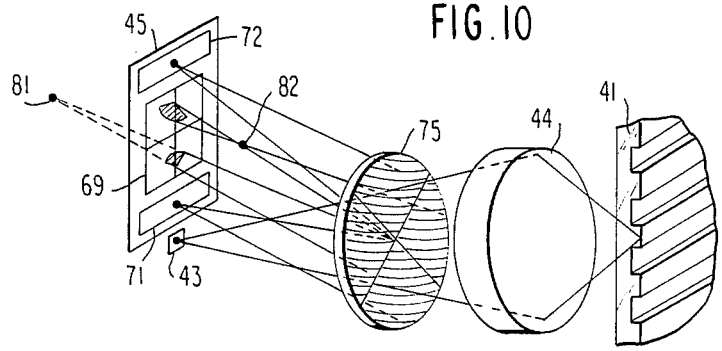
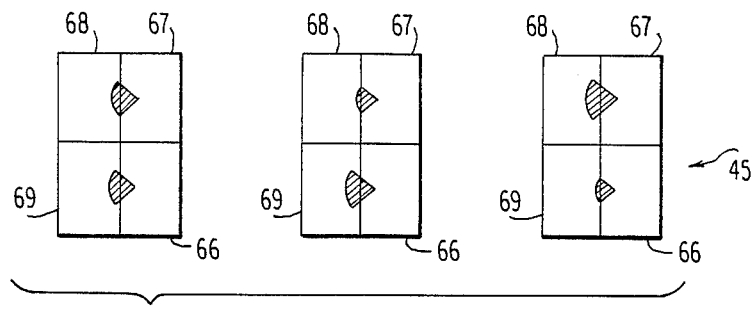
FIG. 11
FIG. 12
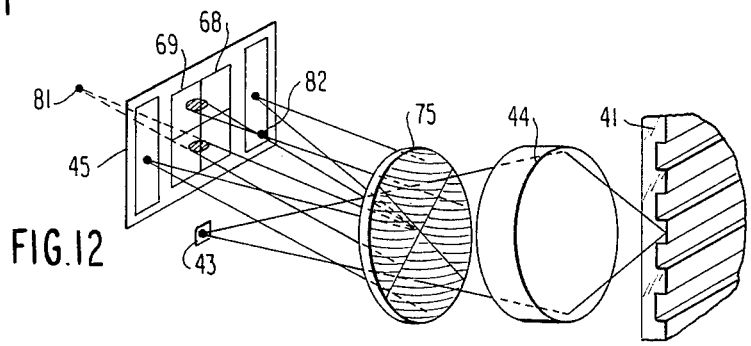
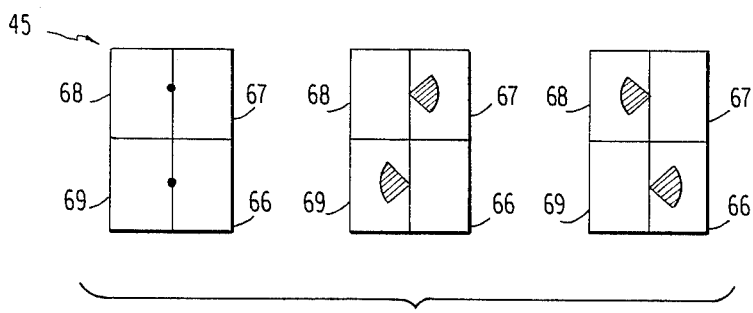
FIG. 13

OPTICAL HEAD COMPRISING A DIFFRACTION GRATING FOR DIRECTING TWO OR MORE DIFFRACTED BEAMS TO OPTICAL DETECTORS

BACKGROUND OF THE INVENTION

This invention relates to an optical head device for use in recording optical information on an optical recording medium and/or reproducing the optical information therefrom in a compact disk (CD) device or a like device which will herein be called an optical disk device. The optical recording medium is typically an optical disk, a digital audio disk, or a digital video disk and will herein be termed an optical disk in general. The optical head device is alternatively referred to briefly as an optical head.

The optical head device includes an optical source, an optical detector assembly, and a focussing lens. The optical source is for generating a coherent beam along a main optical axis and is ordinarily a semiconductor laser. The optical detector assembly is usually a photodiode which is partitioned into a plurality of individual optical detectors. The optical detector assembly is used for the purposes which will be described later in the following. The focussing lens is for focussing an input or incident beam on the optical disk along a lens axis of the focussing lens as a converging beam and responsive to an optical beam reflected from the optical disk as a reflected beam for producing an output or excit beam along the lens axis. Depending on the circumstances, the optical source may be regarded as an element which is separate from the optical head device.

In the manner which will later be described with reference to a few of more than thirty figures of the accompanying drawing, a conventional optical head device comprises a beam splitter for causing the coherent beam to pass therethrough along the main optical axis as the input beam and for splitting the output beam into a split beam which travels along a side optical axis forming an angle of 90° with the main optical axis. An additional optical system is used in directing the split beam to the optical detector assembly along at least one additional optical axis.

An optical head device is described in an article contributed by M. G. Carasso et al to Philips Technical Review, Volume 40 (1982), No. 6, pages 151 to 156, under the title of "The Compact Disc Digital Audio System." According to Carasso et al, the split beam is further divided by the additional optical system into two additional beams which are directed to a four-partitioned optical detector assembly.

Another optical head device is described in the Japanese language on pages 19 to 36 of a publication which is called in translation "Techniques for Mastering CD Digital Audios" and was published May 15, 1985, by a publisher named "Seibundô Sinkôsya," Tokyo, Japan. The split beam travels towards a four-partitioned optical detector assembly along a sole additional optical axis which is an extension of the side optical axis.

Such an optical head device is bulky and heavy. This adversely affects implementation of an optical disk device which is either compact and light-weight or is operable for an optical disk of a large recording capacity. Moreover, the conventional optical head devices are high-priced because it is troublesome to manufacture the beam splitter and the additional optical system and to adjust them for optimum operation of the optical head device.

On the other hand, efforts have been directed on providing a compact and light-weight optical head device to the scoop effect known in connection with semiconductor lasers. It has, however, been found that the optical disk device becomes unstable when the scoop effect is resorted to. Consequently, recent trends are to suppress the scoop effect in the optical disk devices.

SUMMARY OF THE INVENTION

It is therefore an object of the present invention to provide a compact and light-weight optical head device for use in an optical disk device and which makes the optical disk device stably operable.

It is another object of this invention to provide an optical head device of the type described, which is low-priced.

Other objects of this invention will become clear as the description proceeds.

An optical head device to which this invention is applicable, is for use in combination with an optical source for generating a coherent beam along a main optical axis and an optical recording medium and includes a focussing lens for focussing an input beam on the optical recording medium along a lens axis of the focussing lens and responsive to an optical beam reflected from the optical recording medium for producing an output beam along the lens axis. According to this invention, the optical head device comprises a diffraction grating having a plurality of grating regions responsive to the coherent beam for producing a zeroth-order diffracted beam as the input beam and responsive to the output beam for directing a plurality of sidewards diffracted beams to an optical detector assembly along a plurality of side optical axes said diffraction grating having substantially no polarization dependency.

BRIEF DESCRIPTION OF THE DRAWINGS

FIG. 1 shows, partly in section, a side view of a conventional optical head device together with an optical disk;

FIG. 2 likewise shows a side view of another conventional optical head device;

FIG. 3 shows, in various states, an optical detector assembly which is used in the optical head device depicted in FIG. 2;

FIG. 4 schematically shows, together with an optical disk, a perspective view of an optical head device according to a first embodiment of the instant invention;

FIG. 5 shows, in various states, a part of an optical detector assembly which is used in the optical head device depicted in FIG. 4;

FIG. 10 likewise shows a perspective view of an optical head device according to a fourth embodiment of this invention;

FIG. 11 shows, in various states, a part of an optical detector assembly which is used in the optical head device depicted in FIG. 10;

FIG. 12 schematically shows, together with an optical disk, a perspective view of an optical head device according to a fifth embodiment of this invention;

FIG. 13 shows, in various states, a part of an optical detector assembly which is used in an optical head device according to a sixth embodiment of this invention;

DESCRIPTION OF THE PREFERRED EMBODIMENTS

Figure 8:
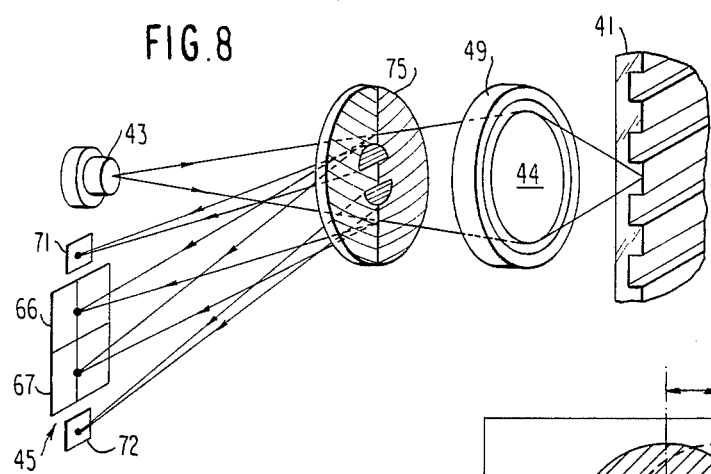
FIG. 8 schematically shows, together with an optical disk, a perspective view of an optical head device according to a second embodiment of this invention.

Referring to FIG. 1, an optical head device will be described at first in general in order to facilitate an understanding of the present invention. The optical head device is for use in an optical disk device in recording optical information on a master optical recording medium (not shown). A plurality of reproductions or stampers are usually manufactured from the master optical recording medium. The optical head device is furthermore for use in such an optical disk device in reproducing the optical information from one of the reproductions. It will be assumed throughout the following that the optical head device is used mainly in reproducing the optical information from one of the reproductions that is depicted at 41 as an optical disk and that has a record or reflecting surface 42. The optical information is recorded on the record surface 42 along a spiral track which has a pitch of, for example, 1.6 microns. The optical information is recorded along the track as pits and intervals or lands between the pits. In the example being illustrated, the pits and the intervals are arranged vertically of the figure along the track depicted as indents.

The optical head device has a main optical axis. An optical source 43 is for generating a coherent beam along the main optical axis. In the manner which will presently be described in detail, a focussing lens 44 is used in receiving an input or incident beam along a lens axis of the focussing lens 44 to produce a converging beam. The focussing lens 44 desiredly focusses the converging beam on the record surface 42 as a light spot of a diameter of about 1 micron. The record surface 42 reflects the converging beam as a reflected beam to the focussing lens 44. Responsive to the reflected beam, the focussing lens 44 produces an output or excit beam along the lens axis. As will shortly be described, an optical detector assembly 45 is used in receiving at least a part of the reflected beam to produce various electrical outputs.

The optical source 43 is ordinarily a semiconductor laser. The optical detector assembly 45 is typically a photodiode which is partitioned into a plurality of individual optical detectors. One of the electrical outputs is used in reproducing the optical information from the optical disk 41. On recording optical information on a master optical recording medium and on reproducing the optical information from the optical disk 41, outputs of the individual optical detectors are used for the purposes which will become clear as the description proceeds. It is possible to understand in the manner described heretobefore that the optical source 43 is an element which is separate from the optical head device depending on the circumstances.

In FIG. 1, the optical head device is what is described in the Carasso et al article referred to hereinabove. A beam splitter 46 is used in causing the coherent beam to pass therethrough as a main beam along the main optical axis. The focussing lens 44 comprises a condenser or collimating lens 47 and an objective lens 48. The condenser lens 47 receives the main beam as the input beam. The objective lens 48 focusses the converging beam on the record surface 42 and receives the reflected beam. The condenser lens 47 directs the output beam back to the beam splitter 46. The output beam is split into a split beam which travels rightwards of the figure along a side optical axis forming an angle of 90° with the main optical axis. An actuator 49 surrounds the objective lens 48 and is used in controlling or minutely moving the objective lens 48 in the manner which will shortly become clear.

An additional optical system is used in directing the split beam to the optical detector assembly 45 along at least one additional optical axis. In this example, the additional optical system consists of first and second wedge prisms 51 and 52 attached to that face of the beam splitter 46 through which the split beam comes out. The optical detector assembly 45 is partitioned into first through fourth individual optical detectors 56, 57, 58, and 59 which are linearly arranged. The first wedge prism 51 is for directing a first additional beam towards the first and the second individual optical detectors 56 and 57 along a first additional optical axis. The second wedge prism 52 is for directing a second additional beam to the third and the fourth individual optical detectors 58 and 59 along a second additional optical axis. Each of the additional beams is focussed by the focussing lens 44 on the optical detector assembly 45. In practice, the wedge prisms 51 and 52 are arranged on a plane perpendicular to the main optical axis rather than on a plane which includes the main optical axis as depicted. Each additional optical axis therefore forms an angle of 90° with the main optical axis.

Outputs of the first through the fourth individual optical detectors 56 to 59 are used in reproducing the optical information from the optical disk 41. Moreover, each pair of the first and the second individual optical detectors 56 and 57 or of the third and the fourth individual optical detectors 58 and 59 is used in detecting a focussing error and in producing a focussing error signal. Still further, the optical detector assembly 45 is used in detecting a tracking error and in producing a tracking error signal.

When the converging beam is desiredly focussed on the record surface 42, the first additional beam is focussed between the first and the second individual optical detectors 56 and 57. The second additional beam is focussed between the third and the fourth individual optical detectors 58 and 59. When the converging beam is out of focus on the record surface 42, namely, defocussed at the record surface 42, the first and the second additional beams either diverge or converge at the optical detector assembly 45. The outputs of the individual optical detectors 56 and 57 or 58 and 59 of each pair are supplied to a differential amplifier (not shown) and used in producing a differential output as the focussing error signal. Two focussing error signals are obtained from the optical detector assembly 45. Either or both of the two focussing error signals are used in making the actuator 49 move the objective lens 48 along the lens axis to desiredly focus the converging beam on the record surface 42. It will now be understood that the optical detector assembly 45, the objective lens 48, and the actuator 49 are in a servo loop for desiredly focussing the converging beam on the record surface 42.

The tracking error is detected by calculating a sum of the outputs of the first and the second individual optical detectors 56 and 57 and a difference between the outputs of the third and the fourth individual optical detectors 58 and 59. Alternatively, a sum is calculated for the outputs of the third and the fourth individual optical detectors 58 and 59 with a difference calculated for the outputs of the first and the second individual optical detectors 56 and 57. The tracking error signal is used in the servo loop in making the actuator 49 move the objective lens 48 parallel to the record surface 42. It is now understood that the tracking error is detected in a push-pull manner.

Turning to FIG. 2, another conventional optical head device is of the type described in the Seibundô Sinkôsya's publication cited heretobefore. The optical head device comprises similar parts designated by like reference numerals.

The additional optical system consists of a concave lens 61 and a cylindrical lens 62 along the side optical axis perpendicularly thereof. The additional optical system therefore produces a single additional beam which travels towards the optical detector assembly 45 along a sole additional optical axis that is an extension of the side optical axis.

Even when the converging beam is desiredly focussed on the record surface 42, the additional beam is subjected by the concave and the cylindrical lenses 61 and 62 to astigmatism known in optics. More particularly, the additional beam is focussed at a sagittal focus depicted by a dot in front of the optical detector assembly 45 and at a meridional focus which is shown by a short line beyond the optical detector assembly 45 merely for clarity of illustration. It is to be noted in this connection that the cylindrical lens 62 has a geometrical axis perpendicular to the main optical axis and to the side optical axis.

Further turning to FIG. 3, the optical detector assembly 45 is partitioned by a pair of orthogonal lines which form an angle of 45° with the geometrical axis of the cylindrical lens 62. The orthogonal line pair defines first through fourth quadrants on the optical detector assembly 45. The quadrant which is nearest to the optical source 43, will be called the first quadrant merely for convenience of the description which follows. Partitioned by the orthogonal lines, first through fourth individual optical detectors 66, 67, 68, and 69 are formed in the first through the fourth quadrants.

When the converging beam is desiredly focussed on the record surface 42, the additional beam falls on the optical detector assembly 45 as a circle in the manner depicted in the middle of the figure. When the converging beam is focussed beyond the record surface 42, the additional beam falls on the optical detector assembly 45 as a vertically elongate ellipse as illustrated leftmost of the figure. When the converging beam is focussed in front of the record surface 42, the additional beam falls on the optical detector assembly 45 as a horizontally elongate ellipse as shown rightmost of the figure.

The focussing error is therefore detected by comparing a sum of the outputs of the first and the third individual optical detectors 66 and 68 with another sum of the outputs of the second and the fourth individual optical detectors 67 and 69. The focussing error is thus detected according to an astigmatism scheme.

The tracking error can be detected in the push-pull manner. More specifically, the tracking error is calculated by a difference between a sum of the outputs of the first and the second individual optical detectors 66 and 67 and another sum of the outputs of the third and the fourth individual optical detectors 68 and 69 when the track has a tangent parallel to a pair of individual optical detectors 66 and 67 or 68 and 69. The tracking error is calculated by a difference between a sum of the outputs of the second and the third individual optical detectors 67 and 68 and another sum of the outputs of the first and the fourth individual optical detectors 66 and 69 when the tangent to the track is parallel to a pair of individual optical detectors 67 and 68 or 66 and 69. Alternatively, the tracking error can be calculated by subjecting the focussing error either to the heterodyne scheme or to the time difference scheme, both described in the above-referenced Seibundô Sinkôsya's publication.

Reviewing FIGS. 1 and 2, the conventional optical head device has a considerable bulk of about 40 mm×40 mm×30 mm although a two-dimensional measure of 45 mm×12 mm is described on page 154 of the above-cited Carasso et al article. The bulk is due to the fact that the optical beam is sidewards directed to the optical detector assembly 45 along the side and the additional optical axes which form an angle of 90° with the main optical axis. Furthermore, the optical head device comprises an appreciable number of glass parts, such as the beam splitter 46 and the additional optical system, and is heavy. The glass parts must individually be manufactured by optical polishing. This renders the optical head device troublesome to manufacture and to adjust. The optical head device consequently becomes high-priced.

Referring now to FIG. 4, an optical head device comprises similar parts designated again by like reference numberals according to a first embodiment of this invention. Like those illustrated with reference to FIGS. 1 and 2, the optical head device is for use in an optical disk device and in combination with the optical disk 41. Alternatively, it is possible to say that the optical head device is for use in combination with the optical disk 41 and the optical source 43 and comprises the focussing lens 44. The optical detector assembly 45 is a known six-partitioned one and comprises first and second additional optical detectors 71 and 72 in addition to the first through the fourth individual optical detectors 66 to 69 of the type described above. The "additional" optical detectors 71 and 72, as herein called, are two of the individual optical detectors of the optical detector assembly 45.

The optical head device has a main optical axis along which the coherent beam is generated by the optical source 43. A reference line will now be defined for the optical head device perpendicularly of the main optical axis. In the example illustrated, the reference line is parallel to the tangent to the track of the optical disk 41.

Instead of the beam splitter 46 and the additional optical system described in conjunction with FIG. 1 or 2, the optical head device comprises a diffraction grating 75 which will be described in detail as the description proceeds. It will be assumed without loss of generality that the diffraction grating 75 is disposed perpendicular to the main optical axis between the optical source 43 and the focussing lens 44. The focussing lens 44 may be the objective lens 48 (FIG. 1) alone. Alternatively, the focussing lens 44 may consist of the condenser lens 47 and the objective lens 48.

Responsive to the coherent beam generated by the optical source 43 along the main optical axis, the diffraction grating 75 produces a zeroth-order diffracted beam as the input or incident beam of the focussing lens 44. Responsive to the output or excit beam of the focussing lens 44, the diffraction grating 75 produces a plurality of sidewards diffracted-beams along a plurality of side optical axes. The sidewards diffracted beams are directed to the optical detector assembly 45 and are used in place of the additional beam or beams described in conjunction with FIG. 1 or 2. A first-order diffracted beam is preferably used as each sidewards diffracted beam in the manner which will presently become clear.

The optical detector assembly 45 is disposed on one side of the main optical axis. More particularly, the optical detector assembly 45 has a pair of sides adjacent to the optical source 43 and remote therefrom. The optical detector assembly 45 has a light receiving surface which is directed to the diffraction grating 75 and is adjustably perpendicular to the main optical axis and therefore adjustably parallel to the diffraction grating 75.

Additionally referring to FIG. 5 for a short while, attention will be directed to the optical detector assembly 45 before describing the diffraction grating 75 more in detail. Two of the four individual optical detectors are nearer to the optical source 43 than others. These two individual optical detectors are partitioned from two others by a partition line which will be named a main partition line and is depicted horizontally of the figure. The main partition line lies on a plane defined as a reference plane by the main optical axis and the reference line described earlier. Two others of the four individual optical detectors are partitioned from two others by an auxiliary partition line which is orthogonal to the main partition line and therefore perpendicular to the reference plane. The main and the auxiliary partition lines are used in defining the first through the fourth quadrants on the light receiving surface. Two individual optical detectors which are nearer to the optical source 43 will be selected as the first and the fourth individual optical detectors 66 and 69. In the example being illustrated, the first additional optical detector 71 is on one side of the main partition line on which the first and the second individual optical detectors 66 and 67 are present. On both sides of the auxiliary partition line, first and second main points will be selected on the main partition line nearer to the optical source 43 and farther therefrom.

In FIG. 4, the diffraction grating 75 has a grating center and preferably a circular effective area. The grating center is coincident with the center of the effective area and is on the main optical axis. The diffraction grating 75 has a grating line which passes through the grating center and is parallel to the reference line. The grating line and the main partition line of the optical detector assembly 45 are therefore on the reference plane. First and second additional points 76 and 77 will be selected near the first and the second additional optical detectors 71 and 72. In the example being illustrated, the first and the second additional points 76 and 77 are farther from the diffraction grating 75 than the light receiving surface.

The diffraction grating 75 has a first grating region upwardly of the figure relative to the grating line. The first grating region has a grating or bar pattern of slits (or bars) along interference fringes between spherical wave fronts or surfaces of the coherent beam generated by the optical source 43 and other spherical wave fronts of a first imaginary beam which would be generated at the first main point. Downwardly of the grating line, a second grating region has a grating pattern of slits along interference fringes between the spherical wave fronts of the coherent beam and other spherical wave fronts of a second imaginary beam which would be generated at the second main point. The diffraction grating 75 is therefore a holographic grating.

A third grating region is formed in the first grating region at a first predetermined area which will presently become clear. The third grating region has a grating pattern of slits along interference fringes between the spherical wave fronts of the coherent beam and other spherical wave fronts of a third imaginary beam which would be generated at the first additional point 76. At a second predetermined area of the second grating region, a fourth grating region has a grating pattern of slits along interference fringes between the spherical wave fronts of the coherent beam and other spherical wave fronts of a fourth imaginary beam which would be generated at the second additional point 77.

The sidewards diffracted beams consist of first through fourth diffracted beams which are produced by the first through the fourth grating regions. The first diffracted beam reaches the light receiving surface of the optical detector assembly 45 at the first main point. The second diffracted beam reaches the light receiving surface at the second main point. The third diffracted beam arrives at the first additional optical detector 71 adjacent to the first additional point 76. The fourth diffracted beam arrives at the second additional optical detector 72 adjacent to the second additional point 77. Incidentally, the grating regions serve to focus the respective diffracted beams at the main points and the additional points 76 and 77 in cooperation with the focussing lens 44 when the converging beam is desiredly focussed on the record surface 42.

Referring more particularly to FIG. 5, the first and the second diffracted beams arrive at the first and the second main points in the manner depicted on the leftmost side of the figure when the converging beam is desiredly focussed on the record surface 42. When the converging beam is incorrectly focussed beyond the record surface 42, the first and the second diffracted beams arrive at the first and the third individual optical detectors 66 and 68 and not at the fourth and the second individual optical detectors 69 and 67 as depicted in the middle of the figure. When the converging beam is focussed in front of the record surface 42, the first and the second diffracted beams arrive at the fourth and the second individual optical detectors 69 and 67 and not at the first and the third individual optical detectors 66 and 68 as shown on the rightmost side of the figure. It is therefore possible to detect the focussing error together with its amount and direction with sense by a difference between a sum of outputs of the first and the third individual optical detectors 66 and 68 and another sum of outputs of the second and the fourth individual optical detectors 67 and 69.

Referring back to FIG. 4, the optical information is reproduced from the optical disk 41 by a total sum of the outputs of the first through the fourth individual optical detectors 66 to 69. Outputs of the first and the second additional optical detectors 71 and 72 may be used in addition to the total sum. The tracking error is detected with-reference to an unbalance which appears in the reflected beam when the converging beam is not correctly focussed on the track. More specifically, the tracking error is detected together with its amount and direction with sense by a difference between the output of the first additional optical detector 71 and the output of the second additional optical detector 72.

It is to be noted in connection with the focussing and the tracking errors that the coherent beam has a wavelength which inevitably varies. This may give rise to a variation in a point at which each diffracted beam arrives on the light receiving surface of the optical detector assembly 45 including the first and the second additional optical detectors 71 and 72. No problem, however, arises provided that the point moves parallel to the main partition line so as not to go either across the auxiliary partition line or outwardly of the optical detector assembly 45. When the point moves parallel to the auxiliary partition line, the first through the fourth individual optical detectors 66 to 69 may produce erroneous outputs. Such a movement of the point is, however, negligibly small because the output beam of the focussing lens 44 has no spacial frequency in the direction of the auxiliary partition line at the first and the second grating regions. As for the first and the second additional optical detectors 71 and 72, no problem arises from movement of the point because each of the detectors 71 and 72 has an area which is sufficiently wide no matter however distant the point may move.

Figure 6:
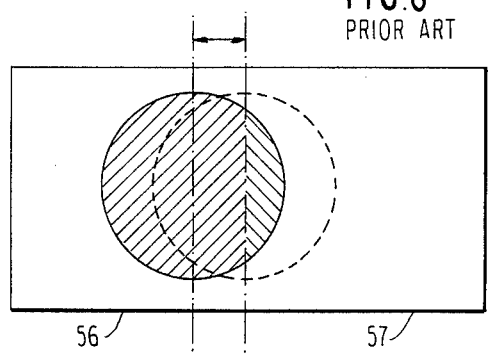
FIG. 6 is a diagram for use in describing operation of the optical head device shown in FIG. 1.

Turning to FIG. 6 and referring again to FIG. 1, either a set of the first and the second individual optical detectors 56 or 57 or another set of the third and the fourth individual optical detectors 58 and 59 is depicted in FIG. 6 on the left-hand and the right-hand sides of a bisecting dash-dot line. When the objective lens 48 is moved in response to a tracking error, the lens axis will become out of coincidence with the main optical axis in the manner indicated by a double-headed arrow drawn between the bisecting dash-dot line and another dash-dot line. The first or the second additional beam will therefore arrive at the optical detector assembly 45 in the manner exemplified by a circle with hatches whereas the first or the second additional beam should fall on the optical detector assembly 45 equally on both sides of the bisecting dash-dot line as depicted by a dash-line circle. In other words, a d.c. offset occurs in the tracking error signal. This restricts compensation of the tracking error to a narrow range.

Figure 7:
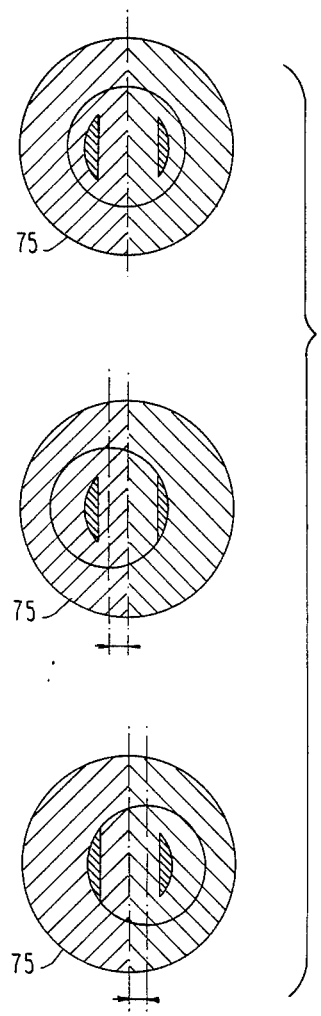
FIG. 7 is a diagram for use in describing operation of the optical head device illustrated in FIG. 4.

Turning further to FIG. 7, a circle is depicted within the diffraction grating 75 to indicate an area at which the output beam of the focussing lens 44 falls. A dash-dot line is drawn centrally of the diffraction grating 75 to indicate the grating line.

When the lens axis of the focussing lens 44 is coincident with the main optical axis, the area is symmetric on both sides of the grating line in the manner depicted at the top of the figure. Even when the output beam reaches the diffraction grating 75 leftwards offset as depicted at the middle of the figure, the first and the second predetermined areas of the third and the fourth grating regions are within the area under consideration. Even when the output beam rightwards moves as illustrated at the bottom of the figure, the third and the fourth grating regions are still in the area in question. It is now appreciated that the optical head device is well operable even if the lens axis becomes out of coincidence with the main optical axis as a result of compensation for the tracking error. In this manner, the third and the fourth grating regions are preferably spaced apart from each other. In this example, the third grating region is surrounded by the first grating region. The fourth grating region is surrounded by the second grating region.

Referring to FIG. 8, an optical head device comprises similar parts designated by like reference numerals according to a second embodiment of this invention. In contrast to the optical head device illustrated with reference to FIG. 4, the tangent to the track of the record surface 42 is disposed perpendicular to the reference line defined earlier. The first and the second additional optical detectors 71 and 72 are arranged along the main partititon line nearer to the optical source 43 and remoter therefrom. Each of the third and the fourth grating regions is therefore bisected by the grating line. Preferably, each of the third and the fourth grating regions is partly surrounded by the first grating region and partly by the second grating region. Incidentally, it is to be noted that the third and the fourth grating regions are on both sides of the grating center.

Reviewing FIGS. 4 and 8, it is obviously possible to adopt the optical head device to an optical disk device in which the tangent to the track of the record surface 42 forms an optional angle with the reference line of the optical head device. The first and the second additional optical detectors 71 and 72 may optionally be positioned insofar as the first and the second additional optical detectors 71 and 72 can individually receive the third and the fourth diffracted beams.

Figure 9:
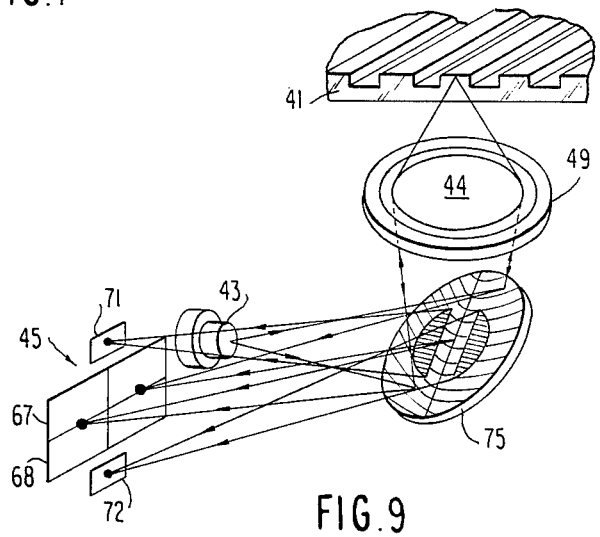
FIG. 9 similarly shows a perspective view of an optical head device according to a third embodiment of this invention.

Referring to FIG. 9, an optical head device comprises similar parts designated by like reference numerals according to a third embodiment of this invention. The optical head device has the main optical axis parallel to the record surface 42. A reflecting diffraction grating, designated again by the reference numeral 75, is substituted for the diffraction grating described in conjunction with FIG. 4 or 8. This renders the optical head device compact in the direction perpendicular to the main optical axis.

Referring now to FIG. 10, an optical head device comprises similar parts designated again by like reference numerals according to a fourth embodiment of this invention. In the example being illustrated, the reference plane is perpendicular to the tangent to the track of the record surface 42. Although similarly named, the first through the fourth grating regions are arranged in the diffraction grating 75 in a different manner when compared with those described in connection with FIGS. 4 and 8.

For the diffraction grating 75, a pair of diameters is used as a pair of grating lines. Each grating line forms a predetermined angle with the reference plane. It will be presumed merely for simplicity of description that the predetermined angle is equal to 45°. The first and the second grating regions are bounded by the pair of grating lines on both sides of the reference plane. The third and the fourth grating regions are depicted downwardly and upwardly of the figure relative to the grating center and are bound also by the pair of grating lines to be bisected by the reference plane.

Like those described in connection with FIGS. 4 and 8, the optical detector assembly 45 has the main partition line on the reference plane. Like in FIG. 8, the first and the second additional optical detectors 71 and 72 are positioned along the main partition line on both sides of the first through the fourth individual optical detectors 66 to 69. A first main focus 81 is selected on the reference plane remoter from the diffraction grating 75 than the light receiving surface of the optical detector assembly 45. A second main focus 82 is selected on the reference plane nearer to the diffraction grating 75 than the light receiving surface.

The first grating region has a pattern of slits along interference fringes between the spherical wave fronts of the coherent beam generated by the optical source 43 and other spherical wave fronts of a first imaginary beam which would be generated at the first main focus 81. The second grating region has a pattern of slits along interference fringes between the spherical wave fronts and other spherical wave fronts of a second imaginary beam which would be generated at the second main focus 82. The third grating region has a pattern of slits along interference fringes between the spherical wave fronts of the coherent beam and other spherical wave fronts of a third imaginary beam which would be generated at a point selected on the first additional optical detector 71. The fourth grating region has a pattern of slits along interference fringes between the spherical wave fronts of the coherent beam and other spherical wave fronts of a fourth imaginary beam which would be generated at a point selected on the second additional optical detector 72.

Additionally referring to FIG. 11, the first diffracted beam reaches the fourth and the first individual optical detectors 69 and 66 as a first quarter circle to be focussed at the first main focus 81. The second diffracted beam is focussed at the second main focus 82 and then reaches the second and the third individual optical detectors 67 and 68 as a second quarter circle. It should be noted in the manner depicted leftmost of the figure that the first and the second quarter circles are congruent with each other when the converging beam is desiredly focussed from the focussing lens 44 onto the record surface 42. Furthermore, the first and the second diffracted beams have a common intensity at the respective quarter circles. When the converging beam is focussed beyond the record surface 42, the first and the second main foci 81 and 82 move away from the diffraction grating 75. The first quarter circle therefore has a wider area as depicted in the middle of the figure. The second quarter circle has a narrower area. It should be noted in this connection that the quarter circles neither come near to the auxiliary partition line of the optical detector assembly 45 nor move away therefrom. The fourth individual optical detector 69 therefore has a stronger output. When the converging beam is focussed in front of the record surface 42, the first and the second main foci 81 and 82 approach the diffraction grating 75. The first quarter circle therefore has a narrower area as depicted rightmost of the figure. The third individual optical detector 68 has an increased output. It is therefore possible to detect the focussing error along with its amount and direction with sense.

In FIG. 10, the tracking error is detected by the outputs of the first and the second additional optical detectors 71 and 72. It will be understood in this connection that the focussing error is detected by the first and the second diffracted beams which are weaker than those used in FIGS. 4, 8, or 9. The tracking error is detected by the third and the fourth diffracted beams which are stronger than those used in FIGS. 4, 8, or 9. It is thus possible to avoid the interference which would otherwise be caused to the tracking error signal by the focussing error signal. This makes it possible to achieve stable focussing servo even during the track seek operation known in the art. It is now understood that the predetermined angle may be smaller than 45°. The third and the fourth diffracted beams will thereby become weaker than those obtained when the predetermined angle is equal to 45°.

Turning to FIG. 12, an optical head device comprises similar parts designated by like reference numerals according to a fifth embodiment of this invention. The optical head device has a structure which is similar to that described with reference to FIG. 10. The first and the second additional optical detectors 71 and 72 are, however, positioned along the auxiliary partition line on both sides of the first through the fourth individual optical detectors 66 to 69. The first and the second grating regions are therefore depicted downwardly and upwardly of the figure relative to the grating center. The third and the fourth grating regions have accordingly modified grating patterns.

Further turning to FIG. 13, an optical head device produces the first and the second quarter circles on the optical detector assembly 45 (FIG. 10 or 12) in a different manner according to a sixth embodiment of this invention. The optical head device has a structure which is similar to that illustrated with reference to FIG. 10 or 12. The first and the second main foci 81 and 82 are, however, selected on the light receiving surface of the optical detector assembly 45. This makes the first and the second diffracted beams have a symmetrical intensity distribution on the optical detector assembly 45. It may be mentioned here that the tracking error signal may interfere with the focussing error signal when the first and the second diffracted beams have an asymmetric intensity distribution on the optical detector assembly 45 as in FIG. 10 or 12. The symmetrical intensity distribution avoids the interference.

Referring more specifically to FIG. 13, the first and the second diffracted beams are focussed on the light receiving surface as depicted leftmost of the figure when the converging beam is desiredly focussed on the record surface 42. In the manner depicted in the middle of the figure, the first diffracted beam falls on the fourth individual optical detector 69 when the converging beam is focussed beyond the record surface 42. The second diffracted beam falls on the second individual optical detector 67. As shown rightmost of the figure. the first diffracted beam falls on the first individual optical detector 66 when the coverging beam is focussed in front of the record surface 42. The second diffracted beam falls on the third individual optical detector 68. It is therefore possible to detect the focussing error as regards its amount and direction with sense by calculating a difference between a sum of the outputs of the second and the fourth individual optical detectors 67 and 69 and another sum of the outputs of the first and the third individual optical detectors 66 and 68.

Figure 14:
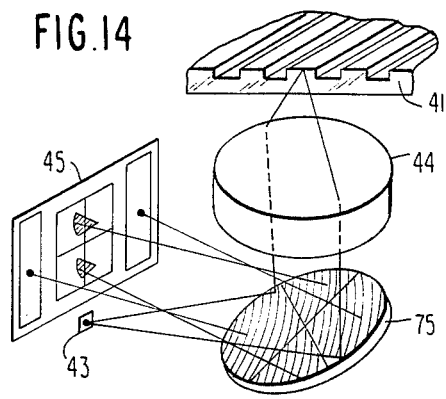
FIG. 14 schematically shows, together with an optical disk, a perspective view of an optical head device according to a seventh embodiment of this invention.

Turning to FIG. 14, an optical head device comprises similar parts designated by like reference numerals according to a seventh embodiment of this invention. The optical head device has a structure which is similar to that described with reference to FIG. 9. That is, the diffraction grating 75 is a reflecting diffraction grating. Although not shown, the reference plane may be parallel to the tangent to the track of the optical disk 41.

Figure 15:
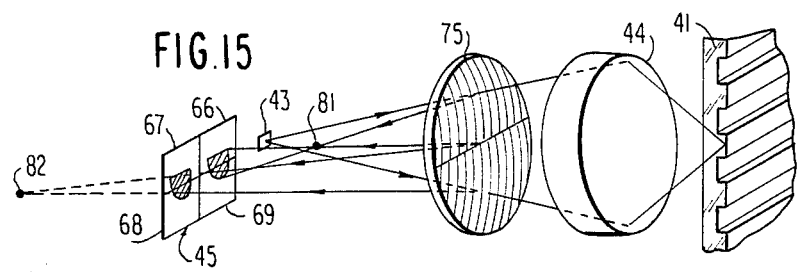
FIG. 15 likewise shows a perspective view of an optical head device according to an eighth embodiment of this invention.

Referring now to FIG. 15, an optical head device comprises similar parts designated again by like reference numerals according to an eighth embodiment of this invention. The optical detector assembly 45 is a four-partitioned optical detector assembly which does not include the first and the second additional optical detectors 71 and 72 thus far described but only the first through the fourth individual optical detectors 66 to 69. The diffraction grating 75 therefore has only the first and the second grating regions which are depicted upwardly and downwardly of the figure relative to the grating line. The first and the second main foci 81 and 82 are selected nearer to and farther from the diffraction grating 75. The first grating region has a pattern of slits along intereference fringes between the spherical wave fronts of the coherent beam and other spherical wave fronts of an imaginary beam which would be generated at the first main focus 81. The second grating region has a pattern of slits along interference fringes between the spherical wave fronts of the coherent beam and other spherical wave fronts of another imaginary beam which would be generated at the second main focus 82.

The first diffracted beam is focussed at the first main focus 81 and then falls on the first and the fourth individual optical detectors 66 and 69 as a first semicircle which spreads on both sides of the main partition line of the optical detector assembly 45. The second diffracted beam falls on the second and the third individual optical detectors 67 and 68 likewise as a second semicircle to be focussed at the second main focus 82. The focussing error is therefore detected by a difference between a sum of the outputs of the first and the third individual optical detectors 66 and 68 and another sum of the outputs of the second and the fourth individual optical detectors 67 and 69.

Attention will be directed to the tracking error. It is to be noted that the grating line is parallel to the main partition line and to the tangent to the track of the record surface 42. The first and the second diffracted beams therefore have different intensities at the first and the second semicircles when the light spot is not correctly on the track. The tracking error is detected by substracting a sum of the outputs of the second and third individual optical detectors 67 and 68 from another sum of the outputs of the first and fourth individual optical detectors 66 and 69. The difference has an absolute value representative of the amount of the tracking error and a sign indicative of the direction with sense.

Figure 16:
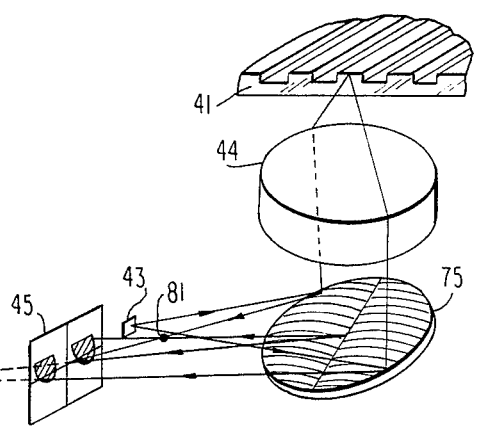
FIG. 16 likewise shows a perspective view of an optical head device according to a ninth embodiment of this invention.

Turning to FIG. 16, an optical head device comprises similar parts designated by like reference numerals according to a ninth embodiment of this invention. The optical head device has a structure which is similar to that described in conjunction with FIG. 15. The diffraction grating 75 is a reflecting diffraction grating.

Figure 17:
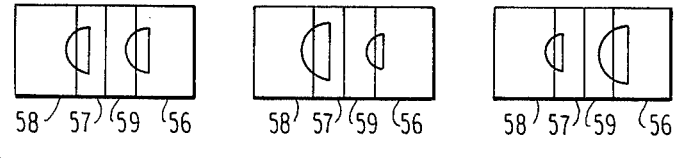
FIG. 17 shows, in various states, an optical detector assembly which is used in an optical head device according to a tenth embodiment of this invention.

Referring to FIG. 17, the optical detector assembly 45 is a four-partitioned optical detector assembly in an optical head device according to a tenth embodiment of this invention. Like in FIG. 1, the optical detector assembly 45 has first through fourth individual optical detectors 56 to 59. Except for the optical detector assembly 45 and consequently the patterns of slits of bars of the first and the second grating regions of the diffraction grating 75, the optical head device has a structure which is similar to that illustrated with reference to FIG. 15.

In FIG. 17, the optical detector assembly 45 is partitioned into the first through the fourth individual optical detectors 56 to 59 by a center line, a first line, and a second line. The center line is on the reference plane. The first and the second lines are parallel to the reference plane and are equally spaced therefrom on both sides thereof. The first and the fourth individual optical detectors 56 and 59 are partitioned by the first line with the fourth individual optical detector 59 disposed contiguous to the center line. The second and the third individual optical detectors 57 and 58 are partitioned by the second line with the second individual optical detector 57 disposed contiguous to the center line.

When the converging beam is desiredly focussed on the record surface 42, the first and the second semicircles have a common area on the optical detector assembly 45 in the manner depicted leftmost of the figure. When the converging beam is not desiredly focussed on the record surface 42, one of the first and the second semicircles has a greater area than the other as shown in the middle or rightmost of the figure.

Figure 18:
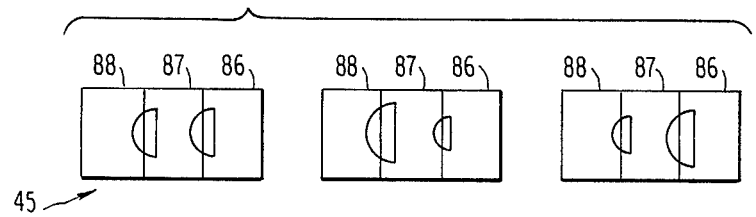
FIG. 18 similarly shows an optical detector assembly which is used in an optical head device according to an eleventh embodiment of this invention.

Turning to FIG. 18, the optical detector assembly 45 is a three-partitioned optical detector assembly in an optical head device according to an eleventh embodiment of this invention. The optical detector assembly 45 consists of first through third individual optical detectors 86, 87, and 88. It is possible to understand that the second individual optical detector 87 is a combination of the fourth and the second individual optical detectors 59 and 57 described in connection with FIG. 17. The diffraction grating 75 is similar to that used in the optical head device described in conjunction with FIG. 17. With this optical detector assembly 45, the tracking error is detected by a difference between the output of the first individual optical detector 86 and the output of the third individual optical detector 88.

Incidentally, the optical detector assembly 45 is partitioned into the three individual optical detectors 86 through 88 by a first and a second line which are parallel to the reference plane and equally spaced therefrom on both sides thereof. The second individual optical detector 87 is positioned between the first and the second lines. The first and the third individual optical detectors 86 and 88 are outwardly contiguous to the first and the second lines, respectively.

Figure 19:
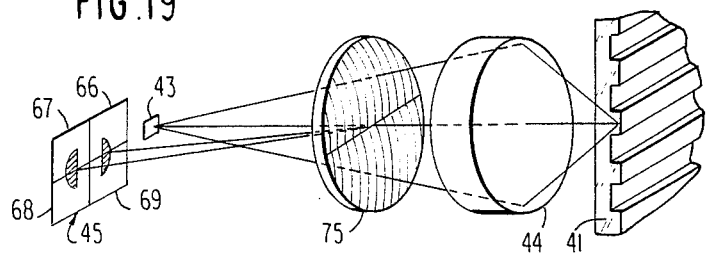
FIG. 19 schematically shows, together with an optical disk, a perspective view of an optical head device according to a twelfth embodiment of this invention.

Referring now to FIG. 19, an optical head device comprises similar parts designated again by like reference numerals according to a twelfth embodiment of this invention. The optical detector assembly 45 is a four-partitioned optical detector assembly of the type described in conjunction with FIG. 15 and consists of the first through the fourth individual optical detectors 66 to 69. The diffraction grating 75 has first and second grating regions which are depicted downwardly and upwardly of the figure relative to the grating line and are somewhat different from those so far described.

For the diffraction grating 75 being illustrated, first and second foci are selected as front and rear foci nearer to and farther from the diffraction grating 75 than the optical detector assembly 45. The front and the rear foci are substantially equally spaced from the light receiving surface of the optical detector assembly 45. Each of the front and the rear foci is a short line which forms an angle of 45° with the reference plane and is similar to the sagittal or the meridional focus described in connection with FIG. 2. The first grating region has a grating or bar pattern of slits or bars such that the first diffracted beam converges at the front focus and then reaches the optical detector assembly 45. The second grating region has a grating pattern of slits such that the second diffracted beam reaches the optical detector assembly 45 and would thereafter converge at the rear focus.

It may be mentioned here that the output beam of the focussing lens 44 has a circular cross-section perpendicularly of the main optical axis. When the congerging beam is desiredly focussed on the record surface 42, the first diffracted beam reaches the first and the fourth individual optical detectors 66 and 69 as a first semicircle which is 90° counterclockwise rotated. The second diffracted beam reaches the second and the third individual optical detectors 67 and 68 as a second semicircle which is also 90° counterclockwise rotated. Each of the first and the second semicircles is a half of a circle of least confusion known in the art of photography.

Figure 20:
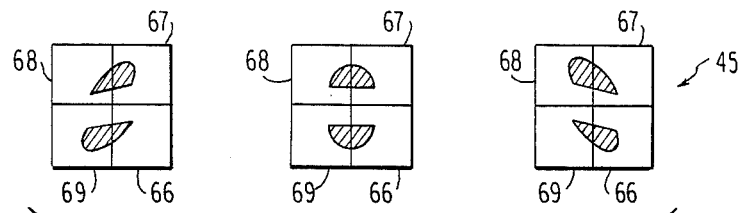
FIG. 20 shows, in various states, an optical detector assembly which is used in the optical head device illustrated in FIG. 19.

Additionally referring to FIG. 20, the first and the second semicircles are depicted in the middle of the figure. In the manner shown leftmost of the figure, the semicircles are distorted as a result of the astigmatism when the converging beam is focussed beyond the record surface 42. As illustrated rightmost of the figure, the semicircles are oppositely distorted when the converging beam is focussed in front of the record surface 42. The focussing error is therefore detected by a difference between a first sum of the outputs of the first and the third individual optical detectors 66 and 68 and a second sum of the outputs of the second and the fourth individual optical detectors 67 and 69.

When the converging beam is focussed out of alignment with the track, the first and the second diffracted beams have different intensities. The tracking error is therefore detected by a difference between a sum of the outputs of the first and the second individual optical detectors 66 and 67 and another sum of the outputs of the third and the fourth individual optical detectors 68 and 69 when the tangent to the track is parallel to the reference plane as depicted. When the tangent to the track is perpendicular to the reference plane, the tracking error is detected by a difference between a sum of the outputs of the first and the fourth individual optical detectors 66 and 69 and another sum of the outputs of the second and the third individual optical detectors 67 and 68. Alternatively, the tracking error signal can be obtained by the heterodyne scheme. As a further alternative, the tracking error can be detected by the time difference scheme by calculating a difference between the focussing error at a time instant and the focussing error at another time instant.

In the manner described in conjunction with FIG. 4, attention must be directed to the fact that the coherent beam has a wavelength which unavoidably varies. This may give rise to a movement of a point at which each diffracted beam reaches the light receiving surface of the optical detector assembly 45 also when the astigmatism is resorted to. The results described in connection with FIG. 4, equally well applies to detection of the focussing and the tracking errors by the astigmatism.

Figure 21:
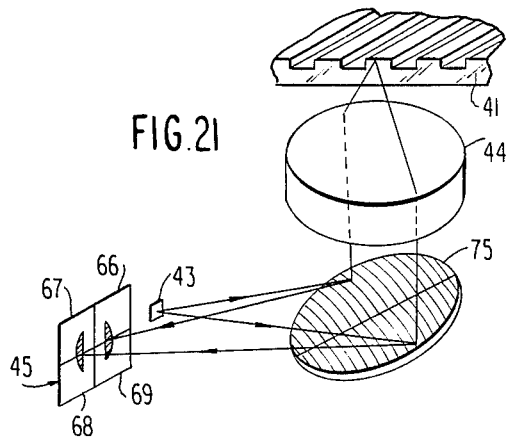
FIG. 21 schematically shows, together with an optical disk, a perspective view of an optical head device according to a thirteenth embodiment of this invention.

Turning to FIG. 21, an optical head device comprises similar parts designated by like reference numbers according to a thirteenth embodiment of this invention. The optical head device has a structure which is similar to that described in connection with FIGS. 19 and 20. The diffraction grating 75 is a reflecting diffraction grating.

Figure 22:
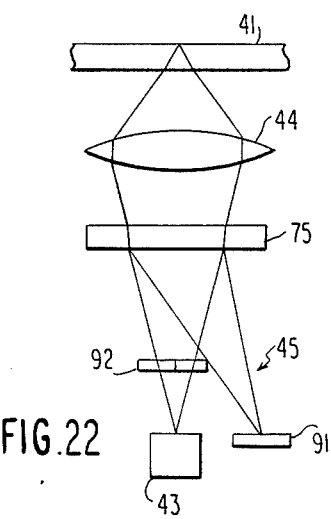
FIG. 22 likewise shows a side view of an optical head device according to a fourteenth embodiment of this invention.
Figure 23:
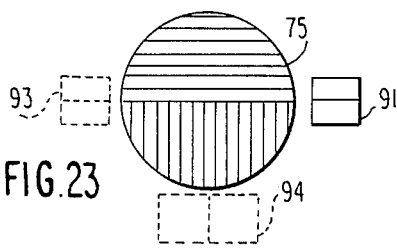
FIG. 23 is a top view of a diffraction grating and an optical detector assembly which are used in the optical head device illustrated in FIG. 22.

Referring now to FIGS. 22 and 23, an optical head device comprises similar parts designated again by like reference numerals according to a fourteenth embodiment of this invention. The optical detector assembly 45 consists of first and second optical detector elements 91 and 92. The first optical detector element 91 is disposed on one side of the main optical axis adjustably perpendicular thereto on a level of the optical source 43. The second optical detector element 91 is placed orthogonally of the first optical detector element 91 relative to the main optical axis on a level between the diffraction grating 75 and the level of the first optical detector element 91. Each optical detector element 91 or 92 is a two-partitioned optical detector element.

The diffraction grating 75 has first and second grating regions depicted in FIG. 23 downwardly and upwardly of the grating line. The first grating region has a first pattern of bars or slits which are perpendicular to the grating line. The second grating region has a second pattern of bars which are parallel to the grating line. It is possible to use a common spacing for the bars of the first and the second patterns. The first optical detector element 91 is divided into two individual optical detectors by a first partition line which is parallel to the grating line. The second optical detector element 92 is divided into two individual optical detectors by a second partition line which is perpendicular to the grating line.

When the converging beam is desiredly focussed on the record surface 42, the first diffracted beam converges on the first partition line. The second diffracted beam arrives as a substantially circular light spot on the light receiving surface of the second optical detector element 92 as best shown in FIG. 22. When the converging beam is not desiredly focussed on the record surface 42, the first diffracted beam moves perpendicularly of the first partition line like in the optical head device described with reference to FIG. 1. It is therefore possible to obtain the focussing error signal by a differential amplifier as before. By using the second optical detector element 92, the tracking error signal is obtained by the push-pull manner described earlier.

The first diffracted beam has a first side optical axis on the plane of FIG. 22 and consequently horizontally of FIG. 23. The first partition line is also horizontal in FIG. 23. The focussing error is therefore not adversely affected by a variation in the wavelength of the coherent beam. This equally well applies to the second diffracted beam and to the tracking error. Furthermore, the tracking error is detected by using diffracted beam which is diffracted orthogonally relative to the diffracted beam used in detecting the focussing error. This makes it possible to neglect the crosstalk between the focussing and the tracking error signals.

In FIG. 23, the first diffracted beam is directed also to a point which is symmetrical relative to the first optical detector element 91, on the other side of the main optical axis. This applies to the second diffracted beam. It is therefore possible to either alternatively or additionally use third and fourth two-partitioned optical detector elements 93 and 94 as depicted in dashed lines. When additionally used, the third and the fourth optical detector elements 93 and 94 are useful in rendering the focussing and the tracking error signals more stable.

Figure 24:
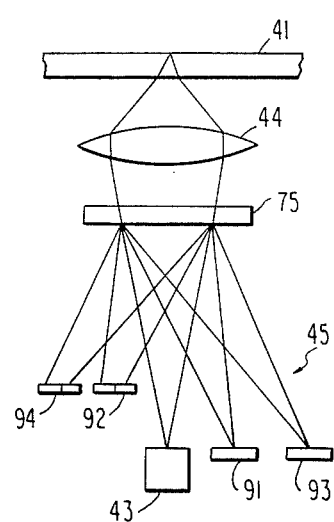
FIG. 24 schematically shows, together with an optical disk, a side view of an optical head device according to a fifteenth embodiment of this invention.
Figure 25:
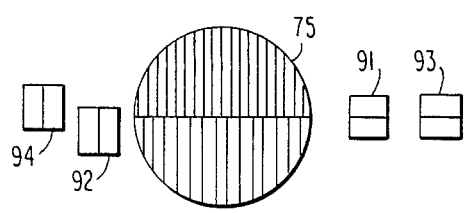
FIG. 25 is a top view of a diffraction grating and an optical detector assembly which are used in the optical head device illustrated in FIG. 24.

Turning to FIGS. 24 and 25, an optical head device comprises similar parts designated by like reference numerals according to a fifteenth embodiment of this invention. The diffraction grating 75 has first and second grating regions depicted downwardly and upwardly of the figure relative to the grating line. In the example being illustrated, each of the first and the second grating regions has a pattern of bars or slits perpendicular to the grating line. The first grating region has a wider bar or slit spacing than the second grating region. The first and the second optical detector elements 91 and 92 will now be called first primary and secondary optical detector elements, which are used in receiving first-order diffracted beam sent from the first grating region rightwards and leftwards symmetrically on both sides of the main optical axis. Second primary and secondary optical detector elements 93 and 94, each two-partitioned optical detector element, are used in receiving first-order diffracted beams which are produced by the second grating region symmetrically on both sides of the main optical axis.

The focussing error is detected by a differential output of either of the first and the second primary optical detector elements 91 and 93. The tracking error is detected by a differential output of either of the first and the second secondary optical detector elements 93 and 94. Use of both the primary and the secondary optical detector elements 91 and 92 or 93 and 94 raises the stability of the focussing and the tracking error signals. In the manner discussed above, the focussing and the tracking errors are not materially affected by a variation in the wavelength of the coherent beam. Inasmuch as the partition lines of the primary optical detector elements 91 and 93 and those of the secondary optical detector elements 92 and 94 are orthoganal, the crosstalk little occurs between the focussing and the tracking error signals.

Figure 26:
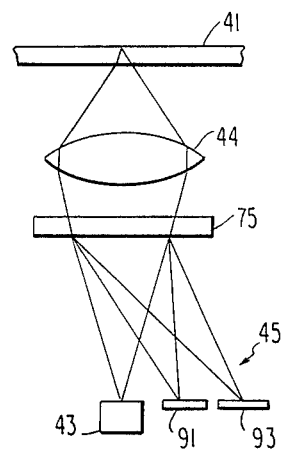
FIG. 26 schematically shows, together with an optical disk, a side view of an optical head device according to a sixteenth embodiment of this invention.
Figure 27:
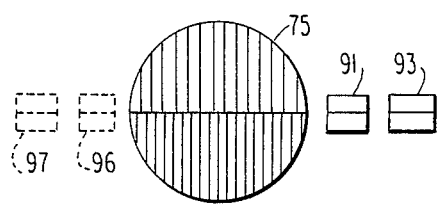
FIG. 27 shows, together with an optical detector assembly, an elevation of a diffraction grating which is used in the optical head device depicted in FIG. 26.

Further turning to FIGS. 26 and 27, and optical head device comprises similar parts designated by like reference numerals according to a sixteenth embodiment of this invention. The diffraction grating 75 has the first and the second grating regions like that described in conjunction with FIG. 25. The first and the second grating regions are depicted upwardly and downwardly of the figure relative to the grating line. It is possible to use as a first and a second optical detector elements, only the first and the second primary optical detector elements 91 and 93 of the type described above. The fact should be noted that the tangent to the track is parallel to the grating line of the diffraction grating 75.

The focussing error is detected as before. The tracking error is detected in the push-pull manner by using the fact that the diffracted beams are produced with different intensities by the first and the second grating regions when the coverging beam is not focussed in alignment with the track. More specifically, the tracking error is detected by a difference between a sum of the outputs of the individual optical detectors of the first primary optical detector element 91 and another sum for the second primary optical detector element 93. It is preferred to use first and second additional optical detector elements 96 and 97 on the other side of the main optical axis symmetrically relative to the first and the second primary optical detector elements 91 and 93 in the manner depicted in dashed lines.

Figure 28:
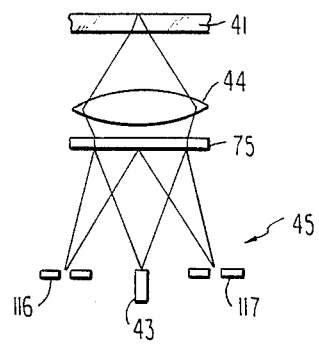
FIG. 28 schematically shows, together with an optical disk, a side view of an optical head device according to a seventeenth embodiment of this invention.
Figure 29:
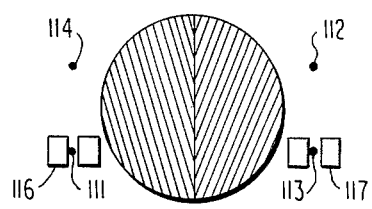
FIG. 29 is a top view of a diffraction grating and an optical detector assembly which are used in the optical head device illustrated in FIG. 28.
Figure 30:
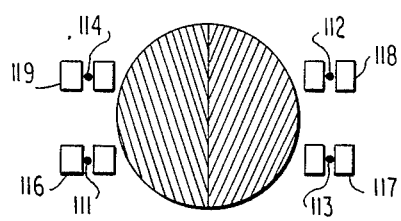
FIG. 30 is a top view of a diffraction grating and an optical detector assembly which are used in a modification of the optical head device depicted in FIG. 28.

Referring now to FIGS. 28 through 30, an optical head device comprises similar parts designated again by like reference numerals according to a seventeenth embodiment of this invention. The diffraction grating 75 has leftside and rightside grating regions as first and second grating regions. Each of the leftside and the rightside grating regions has a pattern of bars or slits obliquely relative to the grating line. Stated otherwise, the leftside grating region has a first pattern of parallel bars or slits which form a predetermined angle with the grating line. The rightside grating region has a second pattern of bars which are symmetrical relative to the bars of the first pattern with respect to the grating line.

When the converging beam is desiredly focussed on the record surface 42, the leftside grating region directs first-order leftwards and rightwards diffracted beams to first and second points 111 and 112. The rightside grating region directs first-order rightwards and leftwards diffracted beams to third and fourth points 113 and 114. In FIG. 29, first and second two-partitioned optical detector elements 116 and 117 are placed at the first and third points 111 and 113 with partition lines disposed parallel to the grating line. It is to be noted here that each partition line is depicted as a double line merely in order to clearly illustrate the first and the third points 111 and 113. Operation is similar to that described with reference to FIGS. 26 and 27. In FIG. 30, first and second two-partitioned additional optical detector elements 118 and 119 are used at the second and the fourth points 112 and 114.

Figure 31:
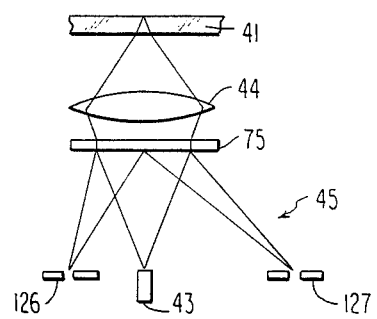
FIG. 31 schematically shows, together with an optical disk, a side view of an optical head device according to an eighteenth embodiment of this invention.
Figure 32:
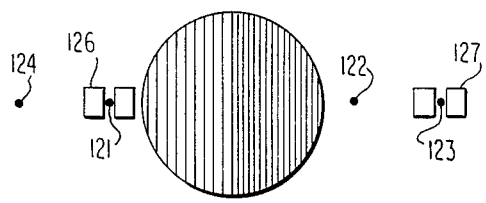
FIG. 32 is a top view of a diffraction grating and an optical detector assembly which are used in the optical head device illustrated in FIG. 31.
Figure 33:
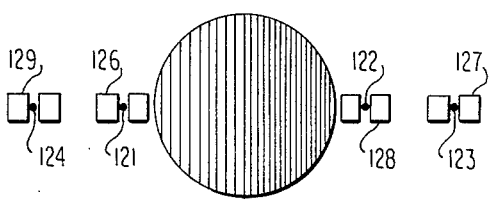
FIG. 33 is a top view of a diffraction grating and an optical detector assembly which are used in a modification of the optical head device illustrated in FIG. 31.

Referring to FIGS. 31 through 33, an optical head device comprises similar parts designated by like reference numerals according to an eighteenth embodiment of this invention. The diffraction grating 75 has first and second grating regions depicted leftwardly and rightwardly of the figure relative to the grating line. The bars or slits are parallel to the grating line in both the first and the second grating regions. The bars have a wider bar spacing in the first grating region than in the second grating region.

The first or leftside grating region directs first-order leftwards and rightwards diffracted beams to first and second points 121 and 122. The second or rightside grating region directs first-order rightwards and leftwards diffracted beams to third and fourth points 123 and 124. In FIG. 32, first and second two-partitioned optical detector elements 126 and 127 are placed at the first and the third points 121 and 123 with partition lines disposed parallel to the grating line. Operation is similar to that described in conjunction with FIGS. 28 and 29. In FIG. 33, first and second two-partitioned optical detector elements 128 and 129 are placed at the second and the fourth points 122 and 124 with partition lines disposed again parallel to the grating line.

Reviewing FIGS. 4, 5, and 7 through 33, the diffraction grating 75 can be manufactured by implementing each imaginary beam by an actual coherent beam which is generated by an actual optical source placed at the point or focus in question. It is, however, preferred to draw the grating or bar patterns for each grating region by an electronic digital computer. This is particularly the case on manufacturing the diffraction grating described in connection with FIG. 19 or 21. Once a master diffraction grating is manufactured, it is readily possible to manufacture replicas of acryl or polycarbonate resin by resorting to the hot-press method or the photopolymer method, both known in the art.

In optical head devices which were actually manufactured according to this invention, the diffraction grating 75 had a bar or slit spacing of the order of 2 to 4 microns and a diameter of about 5 mm as the effective area mentioned earlier and a total diameter of about 7 mm for use in mounting the diffraction grating 75 on the optical head device. Each sidewards diffracted beam had an angle of about 50° with the main optical axis, Each optical head device had a bulk of about 30 mm×20 mm×15 to 20 mm.

On actually manufacturing such an optical head device, it is preferred in order to achieve an optimum light spot distribution on the light receiving surface of the optical detector assembly 45 to adjust the angle which the light receiving surface forms with the main optical axis or with the reference line mentioned heretobefore. When used as the optical source 43, a semiconductor laser is preferably manufactured in combination with the optical detector assembly 45 as a single hybrid package. A mirror can be used either in directing the zeroth-order diffracted beam to a desired direction or in combination with a diffraction grating of the transmission type in place of a reflecting diffraction grating. While an appreciable number of embodiments of this invention have thus far been described mainly for use in reproducing optical information from an optical disk 41, it will be clear that each of the optical head devices can be used in recording optical information on an optical recording medium.

What is claim is:

1. An optical head device for use in combination with an optical source for generating a coherent beam along a main optical axis and an optical recording medium, said optical head device including a focussing lens for focussing an input beam on said optical recording medium along a lens axis of said focussing lens and responsive to an optical beam reflected from said optical recording medium for producing an output beam along said lens axis, wherein the improvement comprises a diffraction grating having a plurality of grating regions responsive to said coherent beam for producing a zeroth-order diffracted beam as said input beam and responsive to said output beam for directing a plurality of sidewards diffracted beams to an optical detector assembly along a plurality of side optical axes, said diffraction grating having substantially no dependency on p-polarized and s-polarized beams and substantially no focal power, each of said grating regions having a grating pattern of slits along interference fringes between spherical wave fronts of two coherent beams having beam axes coincident with said main optical axis and a selected one of said side optical axes.

2. An optical head device for use in combination with an optical source for generating a coherent beam along a main optical axis and with an optical recording medium, said optical head device comprising a focussing lens for focussing an input beam on said optical recording medium along a lens axis of said focussing lens and responsive to an optical beam reflected from said optical recording medium for producing an output beam along said lens axis, and a diffraction grating having a plurality of grating regions responsive to said coherent beam for producing a zeroth-order diffracted beam as said input beam and responsive to said output beam for directing a plurality of sidewards diffracted beams to an optical detector assembly along a plurality of side optical axes, said diffraction grating having substantially no dependency on p-polarized and s-polarized beams and substantially no focal power, wherein said grating regions consist of first through fourth grating regions for directing first through fourth diffracted beams to said optical detector assembly as said sidewards diffracted beams, said first and said second grating regions being on both sides of a grating line which passes through said main optical axis, said third grating regions being in a predetermined area of said first grating region to be surrounded by said first grating region, said fourth grating region being in a predetermined area of said second grating region to be surrounded by said second grating region.

3. An optical head device for use in combination with an optical source for generating a coherent beam along a main optical axis and an optical recording medium, said optical head device including a focussing lens for focussing an input beam on said optical recording medium along a lens axis of said focusing lens and responsive to an optical beam reflected from said optical recording medium for producing an output beam along said lens axis, wherein the improvement comprises a diffraction grating having a plurality of grating regions responsive to said coherent beam for producing a zeroth-order diffracted beam as said input beam and responsive to said output beam for directing a plurality of sidewards diffracted beams to an optical detector assembly along a plurality of side optical axes, said diffraction grating having substantially no polarization dependency, wherein said grating regions consist of first through grating regions for directing first through fourth diffracted beams to said optical detector assembly as said sidewards diffracted beams, said first and said second grating regions being on both sides of a grating line which passes through said main optical axis, said third grating region being in a predetermined area of said first grating region to be surrounded by said first grating region, said fourth grating region being in a predetermined area of said second grating region to be surrounded by said second grating region, and wherein said optical detector assembly is disposed on one side of said main optical axis and is partitioned into first through fourth individual optical detectors and first and second additional optical detectors, a set of said first and said second individual optical detectors and another set of said third and said fourth individual optical detectors being partitioned by main partition line which lies on a plane including said main optical axis and said grating line, a set of said first and said fourth individual optical detectors and another set of said second and said third individual optical detectors being patitioned by an auxiliary partition line which is perpendicular to said plane, said first and said second additional optical detectors being positioned along said auxiliary partition line on both sides of said first through said fourth individual optical detectors, said first grating region being for directing said first diffracted beam to at least one of said first and said fourth individual optical detectors, said second grating region being for directing said second diffracted beam to at least one of said second and said third individual optical detectors, said third and said fourth grating regions being for directing said third and said fourth diffracted beams to said first and said second additional optical detectors, respectively.

4. An optical head device for use in combination with an optical source for generating a coherent beam along a main optical axis and an optical recording medium, said optical head device including a focussing lens for focussing an input beam on said optical recording medium along a lens axis of said focussing lens and responsive to an optical beam reflected from said optical recording medium for producing an output beam along said lens axis, wherein the improvement comprises a diffraction grating having a plurality of grating regions responsive to said coherent beam for producing a zeroth-order diffracted beam as said input beam and responsive to said output beam for directing a plurality of sidewards diffracted beams to an optical detector assembly along a plurality of side optical axes, wherein said grating regions consist of first through fourth grating regions for directing first through fourth diffracted beams to said optical detector assembly as said sidewards diffracted beams, said first and said second grating regions being on both sides of a grating line which passes through said main optical axis, each of said third and said fourth grating regions being bisected by said grating line to be partly surrounded by said first grating region and partly by said second grating region, said third and said fourth grating regions being on both sides of a grating center at which said grating line passes through said main optical axis.

5. An optical head device as claimed in Claim 4, wherein said optical detector assembly is disposed on one side of said main optical axis and is partitioned into first through fourth individual optical detectors and first second additional optical detectors, a set of said first and said second individual optical detectors and another set of said third and said fourth individual optical detectors being partitioned by a main partition line which lies on a plane including said main optical axis and said grating line, a set of said first and said fourth individual optical detectors and another set of said second and said third individual optical detectors being partitioned by an auxiliary partition line which is perpendicular to said plane, said first and said second additional optical detectors being positioned along said main partition line on both sides of said first through said fourth individual optical detectors, said first grating region being for directing said first diffracted beam to at least one of said first and said fourth individual optical detectors, said second grating region being for directing said second diffracted beam to at least one of said second and said third individual optical detectors, said third and said fourth grating regions being for directing said third and said fourth diffracted beams to said first and said second additional optical detectors, respectively.

6. An optical head device as claimed in claim 1, said optical head device having a reference plane which includes said main optical axis and should be disposed perpendicular to a tangent to a track of said optical recording medium, wherein said diffraction grating has a pair of grating lines which intersect each other on said main optical axis, each grating line forming a predetermined angle with said reference plane, said grating regions consisting of first through fourth grating regions for directing first through fourth diffracted beams to said optical detector assembly as said sidewards diffracted beams, said first and said second grating regions being bounded by said pair of grating lines on both sides of said reference plane, said third and said fourth grating regions being bounded by said pair of grating lines and bisected by said reference plane.

7. An optical head device as claimed in claim 6, wherein said predetermined angle is not greater than 45°.

8. An optical head device as claimed in claim 7, wherein said optical detector assembly is disposed on one side of said main optical axis and is partitioned into first through fourth individual optical detectors and first and second additional optical detectors, a set of said first and said second individual optical detectors and another set of said third and said fourth individual optical detectors being partitioned by a main partition line which lies on said reference plane, a set of said first and said fourth individual optical detectors and another set of said second and said third individual optical detectors being partitioned by an auxiliary partition line which is perpendicular to said reference plane, said first and said second additional optical detectors being positioned along said main partition line on both sides of said first through said fourth individual optical detectors, said first grating region being for directing said first diffracted beam to at least one of said first and said fourth individual optical detectors, said second grating region being for directing said second diffracted beam to at least one of said second and said third individual optical detectors, said third and said fourth grating regions being for directing said third and said fourth difracted beams to said first and said second additional optical detectors, respectively.

9. An optical head device as claimed in claim 7, wherein said optical detector assembly is disposed on one side of said main optical axis and is partitioned into first through fourth individual optical detectors and first and second additional optical detectors, a set of said first and said second individual optical detectors and another set of said third and said fourth individual optical detectors being partitioned by a main partition line which lies on said reference plane, a set of said first and said fourth individual optical detectors and another set of said second and said third individual optical detectors being partitioned by an auxiliary partition line which is perpendicular to said reference plane, said first and said second additional optical detectors being positioned along said auxiliary partition line on both sides of said first through said fourth individual optical detectors, said first grating region being for directing said first diffracted beam to at least one of said first and said fourth individual optical detectors, said second grating region being for directing said second diffracted beam to at least one of said second and said third individual optical detectors, said third and said fourth grating regions being for directing said third and said fourth diffracted beams to said first and said second additional optical detectors, respectively.

10. An optical head device as claimed in claim 1, wherein said grating regions consist of first and second grating regions for directing first and second diffracted beams to said optical detector assembly as said sidewards diffracted beams, said first and said second grating regions being on both sides of a grating line which passes through said main optical axis, said first grating region being for making said first diffracted beam converge at a first main focus and then diverge to reach said optically detector assembly, said second grating region being for directing said second diffracted beam to said optical detector assembly as a coverging beam which would converge at a second focus after passing through said optical detector assembly.

11. An optical head device as claimed in claim 10, wherein said optical detector assembly is disposed on one side of said main optical axis and is partitioned into first through fourth individual optical detectors, a set of said first and said second individual optical detectors and another set of said third and said fourth individual optical detectors being partitioned by a line which lies on a plane including said main optical axis and said grating line, a set of said first and said fourth individual optical detectors and another set of said second and said third individual optical detectors being partitioned by a line which is perpendicular to said plane, said first grating region being for directing said first diffracted beam to said first and said fourth individual optical detectors, said second grating region being for directing said second diffracted beam to said second and said third individual optical detectors.

12. An optical head device as claimed in claim 10, wherein said optical detector assembly is disposed on one side of said main optical axis and is partitioned into first through fourth individual optical detectors by a center line, a first line, and a second line, said center line being on a plane which includes said main optical axis and said grating line, said first and said second lines being parallel to said plane equidistant on both sides of said plane, said first and said fourth individual optical detectors being partitioned by said first line with said fourth individual optical detector disposed contiguous to said center line, said second and said third individual optical detectors being partitioned by said second line with said second individual optical detector disposed contiguous to said center line, said first grating region being for directing said first diffracted beam to said first and said fourth individual optical detectors, said second grating region being for directing said second diffracted beam to said second and said third individual optical detectors.

13. An optical head device as claimed in claim 10, wherein said optical detector assembly is disposed on one side of said main optical axis and is partitioned into first through third individual optical detectors by a first and a second line which are parallel to a plane including said main optical axis and said grating line, said first and said second lines being equidistant on both sides of said plane, said second individual optical detector being disposed between said first an said second lines, said first and said third individual optical detectors being outwardly contiguous to said first and said second lines, respectively, said first grating region being for directing said first diffracted beam to said first and said second individual optical detectors, said second grating region being for directing said second diffracted beam to said second and said third individual optical detectors.

14. An optical head device as claimed in claim 1, said output beam having a circular cross-section perpendicularly of said main optical axis, wherein said grating regions consist of first and second grating regions for directing first and second diffracted beams to said optical detector assembly as said sidewards diffracted beams, said first and said second grating regions being on both sides of a grating line which passes through said main optical axis, said first diffracted beam converging at a first line before reaching said optical detector assembly and then reaching said optical detector assembly as a half of a circle of least confusion, said second diffracted beam reaching said optical detector assembly as another half of said circle of least confusion to converage at a second line which is orthogonal to said first line.

15. An optional head device as claimed in claim 14, wherein said optical detector assembly is disposed on one side of said main optical axis and is partitioned into first through fourth individual optical detectors, a set of said first and said second individual optical detectors and another set of said third and said fourth individual optical detectors being partitioned by a line which lies on a plane including said main optical axis and said grating line, a set of said first and said fourth individual optical detectors and anothger set of said second and said third individual optical detectors being partitioned by a line which is perpendicular to said plane, said first grating region being for directing said first diffracted beam to said first and said fourth individual optical detectors, said second grating region being for directing said second diffracted beam to said second and said third individual optical detectors.

16. An optical head device as claimed in claim 1, wherein said grating regions consist of first and second grating regions on both sides of a grating line which passes through said main optical axis, said first grating region having a first pattern of bars perpendicular to said grating line to direct a first diffracted beam as one of said sidewards diffracted beams to a first element of said optical detector assembly, said second grating region having a second pattern of bars parallel to said grating line to direct a second diffracted beam as another of said sidewards diffracted beams to a second element of said optical detector assembly, said first element being placed at a focus of said first diffracted beam and partitioned into two individual optical detectors by a line which is parallel to said grating line, said second element being placed between said second grating region and a focus of said second diffracted beam and partitioned into two individual optical detectors by a line is perpendicular to said grating line.

17. An optical head device as claimed in claim 1, wherein said grating regions consist of first and second grating regions on both sides of a grating line which passes through said main optical axis, said first grating region having a first pattern of bars perpendicular to said grating line at a first bar spacing to direct a first diffracted beam as one of said sidewards diffracted beams to a first element of said optical detector assembly, said second grating region having a second pattern of bars perpendicular to said grating line at a second bar spacing to direct a second diffracted beam as another of said sidewards diffracted beams to a second element of said optical detector assembly, said first element being placed at a focus of said first diffracted beam and partitioned into two individual optical detectors by a line which is parallel to said grating line, said second element being placed between said second grating region and a focus of said second diffracted beam and partitioned into two individual optical detectors by a line which is perpendicular to said grating line.

18. An optical head device as claimed in claim 1, wherein said grating regions consist of first and second grating regions on both sides of a grating line which passes through said main optical axis, said first grating region having a first pattern of bars perpendicular to said grating line at a first bar spacing to direct a first diffracted beam as one of said sidewards diffracted beams to a first element of said optical detector assembly, said second grating region having a second pattern of bars perpendicular to said grating line at a second bar spacing to direct a second diffracted beam as another of said sidewards diffracted beams to a second element of said optical detector assembly, said first and said second elements being placed at foci of said first and said second diffracted beams, respectively, each of said first and said second elements being partitioned into two individual optical detectors by a line which is parallel to said grating line.

19. An optical head device as claimed in claim 1, wherein said gratintg regions consist of first and second grating regions on both sides of a grating line which passes through said main optical axis, said first grating region having a first pattern of parallel bars forming a predetermined angle with said grating line to direct a first diffracted beam as one of said sidewards diffracted beams to a first element of said optical detector assembly, said second grating region having a second pattern symmetrical relative to said first pattern with respect to said grating line to direct a second diffracted beam as another of said sidewards diffracted beams to a second element of said optical detector assembly, said first and said second elements being placed symmetrically on both sides of said main optical axis, each of said first and said second elements being partitioned into two individual optical detectors by a line which is parallel to said grating line.

20. An optical head device as claimed in claim 1, wherein said grating regions consist of first and second grating regions on both sides of a grating line which passes through said main optical axis, said first grating region having a first pattern of bars parallel to said grating line at a first bar spacing to direct a first diffracted beam as one of said sidewards diffracted beams to a first element of said optical detector assembly, said second grating regions having a second pattern of bars parallel to said grating line at a second bar spacing to direct a second diffracted beam as another of said sidewards diffracted beams to a second element of said optical detector assembly, said first and said second elements being placed at foci of said first and said second diffracted beams, each of said first and said second elements being partitioned into two individual optical detectors by a line which is parallel to said grating line.

21. A holographic grating for use in an optical head device comprising an optical source for generating a coherent beam along a main optical axis substantially perpendicular passing through said holographic grating and a four-patitioned optical detector and first and second additional optical detectors on both sides of said four-partitioned optical detector, said four-partitioned and said first and said second additional optical detectors having a common light receiving surface directed to said holographic grating, the light receiving surface of said four-partitioned optical detector beam partition by a main partition line intersecting said main optical axis and an auxiliary partition line which is orthogonal to said main partition line, said four-partitioned optical detector having first and second main points on said main partition line on different sides of said auxiliary partition line, said first and said second additional optical detectors having first and second additional points on a plane defined by said main optical axis and a predetermined one of said main and said auxiliary partition lines, said holographic grating comprising first through fourth grating regions which have slits along interference fringes between spherical wave fronts of the coherent beam generated by said optical source and spherical wave fronts of another coherent beam emitted from said first and said second main points and from said first and said second additional points, respectively.

22. A holographic grating as claimed in claim 21, wherein said first and said second additional points are farther from said holographic grating than the light receiving surface of said first and second additional optical detectors.

23. A holographic grating as claimed in claim 22, wherein said first and said second grating regions are on different sides of a grating line which is defined on said holographic grating by a plane including said main optical axis and said main partition line.

24. A holographic grating as claimed in claim 23, wherein said third and said fourth grating regions are on different sides of said grating line and are surrounded by said first and said second grating regions.

25. A holographic grating as claimed in claim 23, wherein each of said third and said fourth grating regions is bisected by said grating line and surrounded partly by said first grating region and partly by said second grating region.

* * * * *

UNITED STATES PATENT AND TRADEMARK OFFICE
CERTIFICATE OF CORRECTION

PATENT NO. : 4,945,529

DATED : JULY 31, 1990

INVENTOR(S) : YUZO ONO; YUTAKA YAMANAKA; YASUO KIMURA

It is certified that error appears in the above-identified patent and that said Letters Patent is hereby corrected as shown below:

ON TITLE PAGE:

ABSTRACT, line 7, delete "beaem" and insert -- beam --.

Column 11, line 3, delete "partititon" and insert -- partition --.

Column 19, line 49, delete "50°" and insert -- 20° --.

Column 24, lines 35 and 36, delete "converage" and insert -- converge --.

Signed and Sealed this

Fifth Day of November, 1991

Attest:

HARRY F. MANBECK, JR.

*Attesting Officer*    *Commissioner of Patents and Trademarks*